J. A. JOHNSON.
CLOTHES LINE HANDLING AND MEASURING MACHINE.
APPLICATION FILED MAR. 31, 1915.

1,161,687.

Patented Nov. 23, 1915.

3 SHEETS—SHEET 1.

WITNESSES

INVENTOR
John A. Johnson
BY
ATTORNEYS

J. A. JOHNSON.
CLOTHES LINE HANDLING AND MEASURING MACHINE.
APPLICATION FILED MAR. 31, 1915.

1,161,687.

Patented Nov. 23, 1915.
3 SHEETS—SHEET 2.

WITNESSES

INVENTOR
John A. Johnson
BY
ATTORNEYS

J. A. JOHNSON.
CLOTHES LINE HANDLING AND MEASURING MACHINE.
APPLICATION FILED MAR. 31, 1915.
1,161,687.
Patented Nov. 23, 1915.
3 SHEETS—SHEET 3.
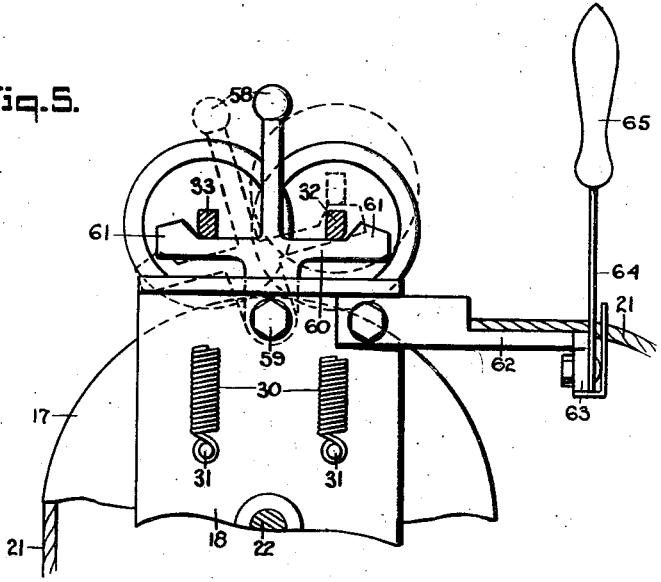
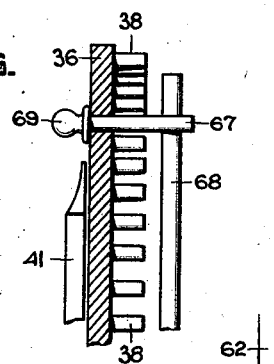
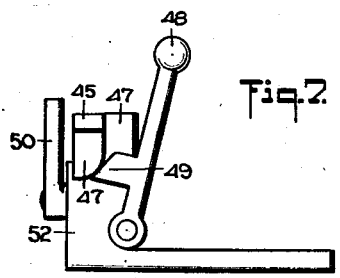
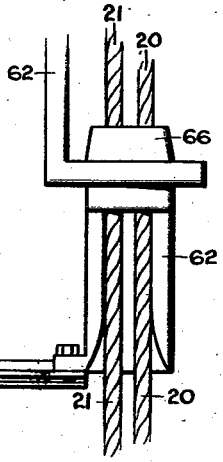
WITNESSES
INVENTOR
John A. Johnson
BY
ATTORNEYS

UNITED STATES PATENT OFFICE.

JOHN A. JOHNSON, OF NEW YORK, N. Y.

CLOTHES-LINE HANDLING AND MEASURING MACHINE.

1,161,687.  Specification of Letters Patent.  Patented Nov. 23, 1915.

Application filed March 31, 1915. Serial No. 18,286.

*To all whom it may concern:*

Be it known that I, JOHN A. JOHNSON, a citizen of the United States, and a resident of the city of New York, borough of Brooklyn, in the county of Kings and State of New York, have invented a new and Improved Clothes-Line Handling and Measuring Machine, of which the following is a full, clear, and exact description.

Among the principal objects which the present invention has in view are: to provide means for mechanically controlling the delivery of rope from a supply coil to a cutting station; to provide means for preventing the recession of the severed ends of said rope; to provide means for registering the length of the rope delivered past the cutting station; to provide means for delivering ropes of different characters from independent supplies without mutual interference; and to avoid fraying or abrading the material being handled.

Figure 1:
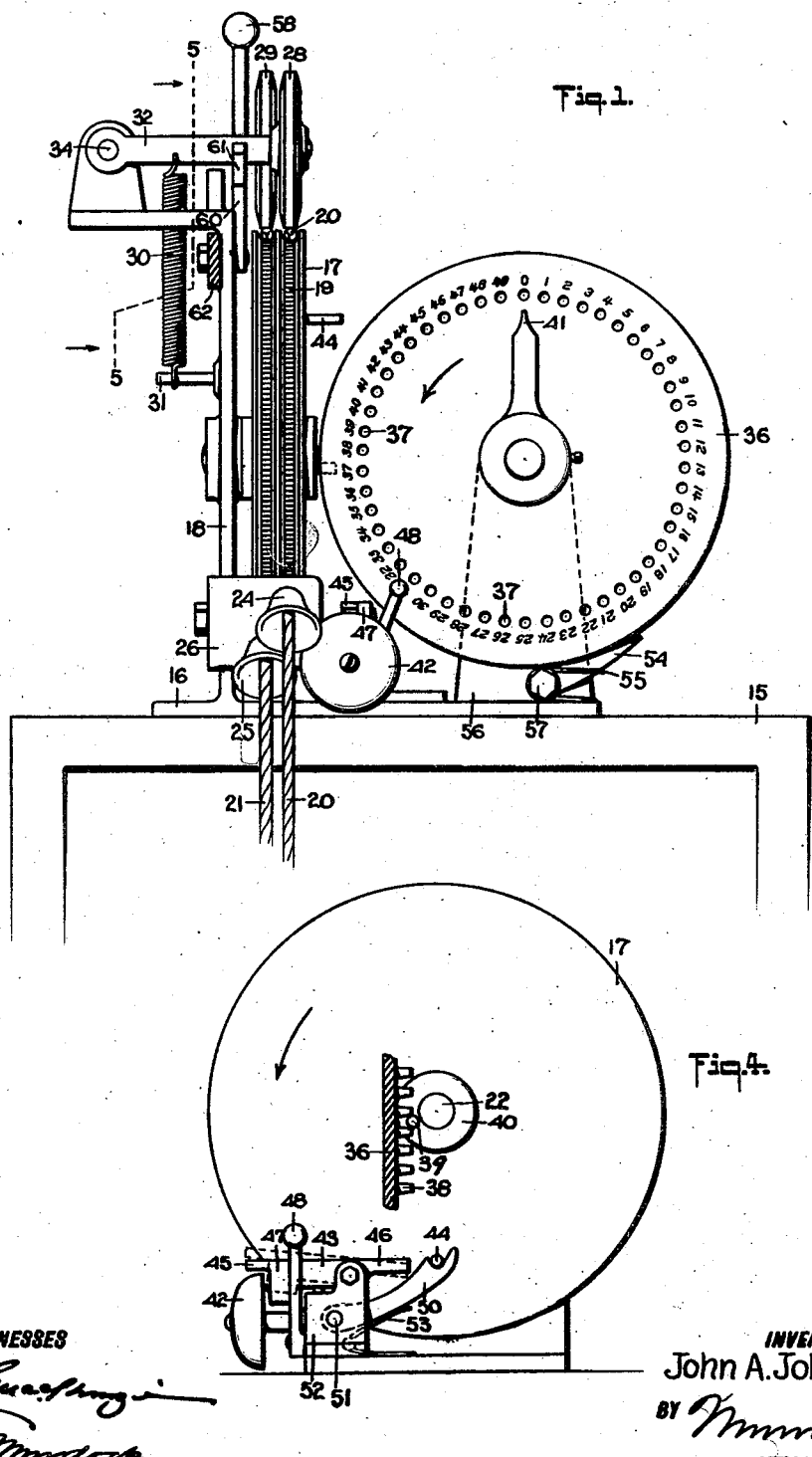
Figure 2:
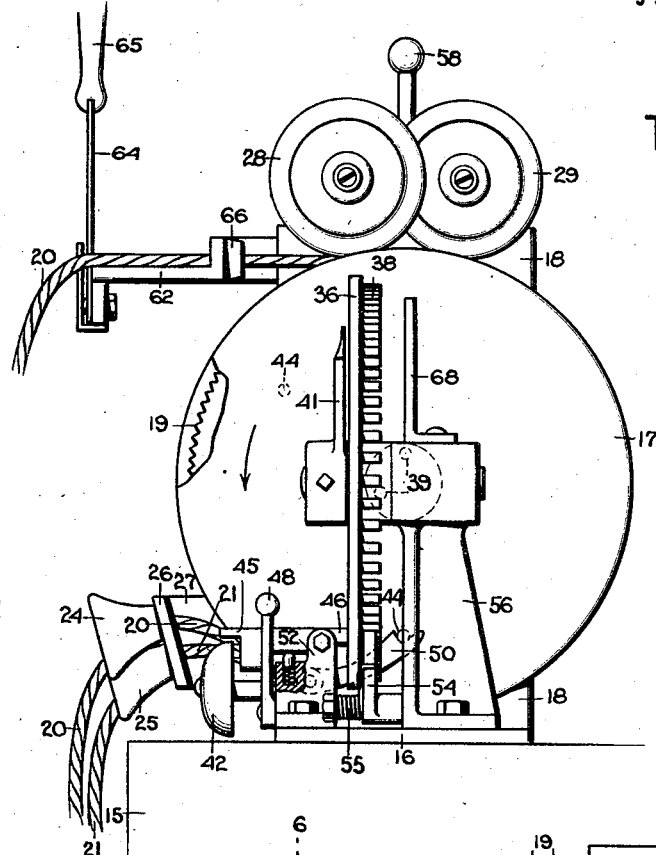
Figure 3:
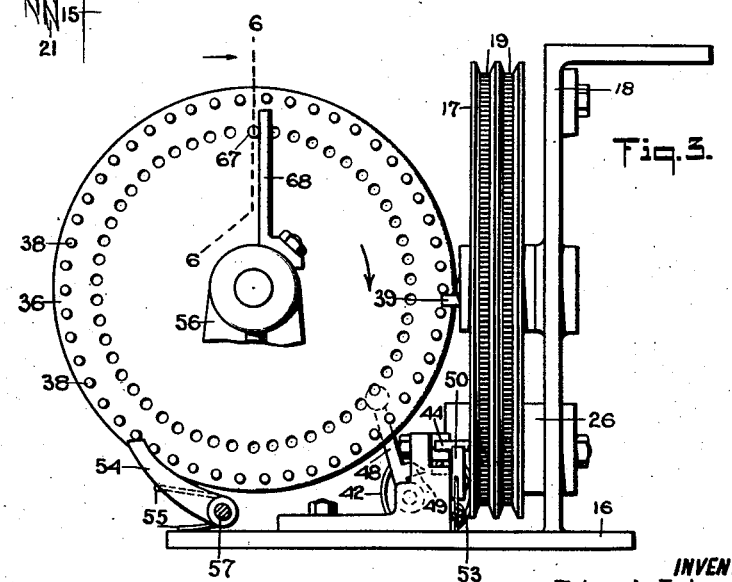

*Drawings.*—Figure 1 is a front elevation of a machine constructed and arranged in accordance with the present invention; Fig. 2 is a side view of the same; Fig. 3 is a rear elevation of the same; Fig. 4 is a detail view showing the audible signal and detent controlling the measuring disk; Fig. 5 is a detail view on an enlarged scale, in section, the section being taken as on the line 5—5 in Fig. 1; Fig. 6 is a detail view on an enlarged scale, in section, the section being taken as on the line 6—6 in Fig. 3; Fig. 7 is a detail view of a device employed for discontinuing the audible signal; Fig. 8 is a detail view of the delivery guide and cutting tool for severing the measured rope from the main supply.

*Description.*—The present invention is particularly designed to facilitate the handling of clothes lines, and to this end the mechanism is mounted upon a receptacle 15. For convenience of handling, the mechanism is provided with a base plate 16, on which the various moving parts are mounted. Of primary importance is the wheel 17, to support which a standard 18 is provided. The wheel 17 has one or more grooves formed in the perimeter thereof, in which run ropes 20 and 21. In the bottoms of the grooves are holding teeth 19. The ropes 20 and 21 are drawn from supplies contained in the receptacle 15. The wheel 17 is loose on the stud shaft 22.

The ropes 20 and 21 are guided in passing from the receptacle 15 to the wheel 17 and grooves thereof, by bell-shaped thimbles 24 and 25. The thimbles 24 and 25 are both built upon and extended from a face plate 26, which is integrally or rigidly formed with the standard 18, being connected therewith by a bracket 27. The ropes are wound around the wheel 17, and are normally held by the teeth 19, against retraction therefrom. Normally the wheels 28 and 29 operate as grips to prevent the retraction of the ropes from engagement with the wheel 17. With this object in view the wheels are held firmly upon said ropes by springs 30, which springs are anchored at one end of the standard 18 by means of pins 31, and at the opposite ends engage pivoted arms 32 and 33, respectively. The arms 32 and 33 are pivotally mounted on a shaft 34 set out from an auxiliary standard 35.

The circumference of the wheel 17 is known and forms the unit of measurement when employing the present machine. To register the number of such units represented in the length of rope delivered is the office of a dial plate 36. The plate 36 is provided with a series of perforations 37 arranged adjacent the periphery of said plate and in spaced relation corresponding with the designating numerals with which each of said perforations is supplied. Said numerals are serially arranged to indicate the number of turns of the wheel 17. To this end the plate 36 is furnished, at the back thereof, with a number of pins 38, said pins corresponding with the perforations 37. The pins 38 are disposed on the plate 36 adjacent the periphery thereof and in the path of an engaging pin 39 set out from the hub 40 of the wheel 17, shown best in Figs. 3 and 4 of the drawings.

It will be observed by reference to Fig. 4 of the drawings, that when the wheel 17 is revolved in the direction indicated by the arrow therein shown, the pin 39 will engage successively the pins 38 on the plate 36, a fragment of which plate will be found illustrated in said figure of the drawings. When so engaged, the pin 39 moves the plate 36 a distance corresponding with the interval between said pins 38 and the perforations 37. The result of this operation is that the perforations 37 and the numerals associated therewith are moved in the direction indicated by the arrow in Fig. 1, past a stationary pointer 41, which indicates the reading position for the numerals on the dial plate 36. Thus, if the numeral 41 be at any time disposed opposite the pointer 41, it would indicate to the person operating the machine that the wheel 17 has been rotated forty-one times, and that an equivalent amount of rope had been delivered from the machine. It will be understood that in the operation of the machine, at the beginning of each operation it is intended that the dial plate 36 shall be returned to the zero station thereof.

As an auxiliary to the plate 36, and to be used in lieu thereof, there is provided a bell 42. The mechanism illustrated in the drawings provides a pivoted hammer 43, which is operated by engagement with a pin 44 extended from the side of the wheel 17 and out of the path of the plate 36. This pin is seen best in Fig. 4 of the drawings. The hammer 43 has a head 45 and a tailpiece 46 which is normally disposed in the path of the pin 44. The hammer head 45 is moved to strike the bell 42 by the weighted member 47 with which said hammer is provided adjacent the head 45 thereof. As shown in dotted lines in Fig. 4 of the drawings, when the pin 44 passes out of engagement with the tailpiece 46 after repressing it, the weighted member 47 drops the head 45 upon the bell 42, to sound the same. When thus operating, it is obvious that the attendant, by counting the strokes of the bell, may be advised as to the number of revolutions of the wheel 17, and consequently of the quantity of rope drawn from said wheel.

If at any time it is desired to discontinue the employment of the bell 42, the handle 48 is rocked forward to insert the tooth 49 mounted on said handle under the weighted member 47, lifting the same and the hammer head 45 connected therewith, to the dotted position shown in Fig. 4 of the drawings, in which position the tailpiece 46 avoids the pin 44. When the handle 48 is thus disposed, the bell 42 and parts connected therewith are inactively disposed.

The pin 44 above mentioned has a further function, in that it serves to prevent the retraction of the wheel 17, or to lock the same against the backward rotation thereof. To this end there is provided a latch arm 50 having a recessed end to receive the pin 44, as shown best in Fig. 4 of the drawings. The arm 50 is pivoted, by means of a pin 51, on a standard 52. A spring 53 functions to lift the free end of the arm 50 into the path of the pin 44. The arm 50, as shown in the drawings, is so disposed as to resist effectively any tendency to be depressed by the pin 44 when moved backward in opposition to the direction indicated by the arrow in Fig. 4 of the drawings. The elongated end of the arm 50, however, serves to depress said arm to permit the pin 44 freedom of movement in the proper direction, said end further serving to partially arrest the wheel 17 and said pin, and in this manner operate as a finder for said wheel.

The plate 36 is quieted or prevented from racing by a spring-seated brake 54. The brake 54 is seated by means of a spring 55, which is pivoted on a standard 56 by a pivot bolt 57.

In the employment of the machine, it is desired to draw one of the supplies of rope 20 or 21, the other remaining for the time in the condition to which it has been advanced by the previous operation. To this end, the wheels 28 and 29 are alternately lifted to relieve the frictional engagement of one or other of the supplies of rope 20 or 21, as the case may be. The release is effected by rocking a handle 58, which is pivoted by a bolt 59, as shown best in Fig. 5 of the drawings, on the standard 18. The handle 58 is furnished with a cross beam 60, said cross beam extending under the pivoted arms 32 and 33, as shown in full lines in said figure. At both ends the beam 60 is provided with head blocks 61. The blocks 61 are provided with cam surfaces adjacent the arms 32 and 33, to lift the same when drawn thereunder, as indicated by the dotted lines in said Fig. 5 of the drawings. In accordance with the direction in which the handle 58 is rocked, one or other of the wheels 28 or 29 is lifted, the remaining wheel retaining its grip on the rope disposed in the groove in the drum directly below it. In the position shown by full lines in Fig. 5 of the drawings, both wheels are in gripping position to the rope disposed beneath. It will be understood that when the pressure of the wheels 28 and 29 is removed from the rope, the grip of the teeth 19 immediately below the lifted wheel is not sufficient to feed the rope.

The ropes 20 and 21 are extended forward from the wheel 17 to rest in independent channels formed in an eye-plate 62. Pivotally mounted on the depressed end 63 of said eye-plate is a cutting knife 64, the handle 65 whereof is normally elevated to the position best shown in Fig. 5 of the drawings. The knife 64 operates in conjunction with the squared end of an apron-like extension of the eye-plate 62.

*Operation.*—The supplies or coils of rope such as 20 and 21, having been deposited in the receptacle 15, the free ends thereof are passed through the thimbles 24 and 25 under the wheel 17 and disposed in the grooves thereof. The ends are then passed over said wheel, under the wheels 28 and 29, respectively, and from thence are passed through the eye 66 of the eye-plate 62. The handle 58 is disposed as shown in full lines in Fig. 5 of the drawings, in which position both of the wheels 28 and 29 press upon the ropes 20 and 21, to hold the same on the wheel 17. The wheel 17, when in this position, is held by the latch arm 50 from retraction, the pin 44 resting in the crotched end of said arm, as seen in Fig. 4 of the drawings. If it is desired to purvey the rope 20, the operator moves the handle 58 to lift the wheel 29, which relieves the frictional grip of the rope 21 on the wheel 17. The rope 20 is then manually delivered by grasping it and pulling the same outward. As indicated above, the pin 39 engages one of the pins 38 on the plate 36 to rotate said plate a distance equal to one of the intervals between the perforations 37 thereof. As each of the pins 38 is thus engaged and moved by the pin 39, the plate 36 rotates in the direction indicated by the arrow in Fig. 1 of the drawings, and successively presents in juxtaposed relation to the pointer 41 the perforations 37 and the numeral indexes associated therewith. Thus, if the circumference of the wheel 17 and the grooves therein measures one yard, and it is desired to measure forty yards, the rope will be drawn outward until the perforation 37 associated with the numeral 40 is oppositely disposed with reference to the pointer 41. This would indicate that the wheel 17 had made forty complete revolutions, delivering an amount of rope therefrom equal to the circumference multiplied by 40, or forty yards of rope. The operator then grasps the handle 65 of the knife 64, and by swinging said knife past the edge of the eyelet-plate 62, severs the measured quantity of rope from the main supply. The handle 58 is now moved to the central position shown in Fig. 5 of the drawings, where both of the rope supplies are engaged by the wheels 28 and 29. Under ordinary circumstances, during this operation the bell 42 and parts connected therewith are inactively disposed, the handle 48 having been moved to the position above indicated, wherein the head 45 and tailpiece 46 are disposed as shown in dotted lines in Fig. 4 of the drawings. If, however, it is desired to use said bell, the handle 48 is retracted to permit the head 45 to strike the bell when impelled thereto by the pin 44 passing over the tailpiece 46.

The preferred function of the perforations 37 is to receive a stop-pin 67, which, when extended through the plate 36 and perforations 37 therein, extends into the path of a striker-bar 68. This construction is best shown in Figs. 3 and 6 of the drawings. The pin 67 is provided with a knob 69, by means of which it is inserted and withdrawn from one other of the perforations 37. When employing said pin 67, it is placed in one of the perforations 37 associated with a numeral indicating the number of yards which it is desired to purvey. Thus, returning to the former illustration, if it was desired to purvey forty yards of the rope indicated, the pin 67 would be extended through the perforation 37 associated with the numeral 40 on the dial plate 36. When in the course of operation the dial plate 36 is moved by the successive engagements of the pin 39 with the pins 38 thereof until the pin 67 engages the bar 68, the further movement of said plate is prevented, and consequently the rotation of the wheel 17 is arrested. If the quantity of rope to be delivered at any one time exceeds the measuring capacity of the single revolution of the plate 36, the pin 67 is withdrawn until the remainder of the quantity to be purveyed is a fraction of the measuring capacity of the plate. It is then placed in the perforation 37 indicating the fraction. Thus, if it be desired to measure one-hundred-and-ninety yards of rope, this would be accomplished by pulling off sufficient of the rope to rotate the plate 36 three complete revolutions while the pin 67 was removed. The operation would then be interrupted long enough for the pin 67 to be inserted in the perforation 37 associated with the numeral 40, after which the operation would be resumed until said pin 67 engaged the striking bar 68. The desired quantity would then be found to have been measured and ready for severance from the supply by operating the knife 64 in the manner above stated.

Claims:

1. A machine as characterized comprising a rotary wheel; a rotary dial plate; means for manually rotating said wheel; a plurality of pins mounted on said dial plate adjacent the periphery thereof; a pin mounted on said wheel adjacent the axis thereof for engaging successively said pins on said dial plate to move said plate step by step in correspondence with the revolutions of said wheel; an audible member; means operatively connecting said wheel and said audible member for operating the latter each time the wheel is completely rotated and means engaging said wheel after the audible member has been operated, said means preventing the retraction of said wheel.

2. A machine as characterized comprising a rotary wheel; a rotary dial plate; means for manually rotating said wheel; a plurality of pins mounted on said dial plate adjacent the periphery thereof; a pin mounted on said wheel adjacent the axis thereof for engaging successively said pins on said dial plate to move said plate step by step in correspondence with the revolutions of said wheel; an audible member; means operatively connecting said wheel and said audible member for operating the latter each time the wheel is completely rotated; and a latch arm interposed between said audible member and operating mechanism connected therewith and said wheel for preventing the engagement of said wheel and said operating mechanism when said wheel is retracted.

3. A machine as characterized comprising a rotary wheel; a rotary dial plate; means for manually rotating said wheel; means intermittently operatively connecting said dial plate and said wheel to move said dial plate step by step, for indicating the number of revolutions of said wheel; means for frictionally holding rope on the periphery of said wheel for rotating said wheel when said rope is drawn over said wheel, said means embodying a plurality of rolling members, each engaging a separate supply of said rope; a plurality of yielding members for operatively engaging said rolling members to press the same upon their respective ropes; and a rocking member for alternately lifting said rolling members from engagement with their respective ropes.

4. A machine as characterized comprising a rotary wheel; a rotary dial plate; means for manually rotating said wheel; means intermittently operatively connecting said dial plate and said wheel to move said dial plate step by step, for indicating the number of revolutions of said wheel; means for frictionally holding rope on the periphery of said wheel for rotating said wheel when said rope is drawn over said wheel, said means embodying a plurality of rolling members, each engaging a separate supply of said rope; a plurality of yielding members for operatively engaging said rolling members to press the same upon their respective ropes; and a rocking member for alternately lifting said rolling members from engagement with their respective ropes, said rocking member having a plurality of cam-shaped members for extension beneath the supports of said rolling members to lift the same from engagement with their respective ropes.

In testimony whereof I have signed my name to this specification in the presence of two subscribing witnesses.

JOHN A. JOHNSON.

Witnesses:
E. F. MURDOCK,
PHILIP D. ROLLHAUS.